United States Patent [19]

Ichihashi

[11] Patent Number: 4,809,749
[45] Date of Patent: Mar. 7, 1989

[54] SOLENOID VALVE

[75] Inventor: Kouji Ichihashi, Higashimatsuyama, Japan

[73] Assignee: Diesel Kiki Co., Ltd., Tokyo, Japan

[21] Appl. No.: 129,758

[22] Filed: Dec. 7, 1987

[30] Foreign Application Priority Data

Feb. 10, 1987 [JP] Japan .............................. 62-17175[U]

[51] Int. Cl.$^4$ ............................................ F15B 13/044
[52] U.S. Cl. ........................... 137/625.65; 137/625.68; 251/129.17
[58] Field of Search ....................... 137/625.65, 625.68; 251/129.17

[56] References Cited

U.S. PATENT DOCUMENTS 4,744,389  5/1988  Ichihashi .......................... 137/625.65
4,763,872  8/1988  Ichihashi et al. ................. 251/30.01

Primary Examiner—Gerald A. Michalsky
Attorney, Agent, or Firm—Wenderoth, Lind & Ponack

[57] ABSTRACT

A solenoid valve in which the displacement of a spool slidably contained within a valve bore of a valve body is controlled by means of the displacement of a plunger slidably contained within a plunger chamber, one end of the valve bore communicating with the plunger chamber being blocked, the valve body being provided therein with an oil reservoir chamber communicating with the valve bore, and the oil reservoir chamber being communicated with the plunger chamber.

4 Claims, 1 Drawing Sheet

SOLENOID VALVE

BACKGROUND OF THE INVENTION

1. Field of the Invention

This invention relates to a solenoid valve in which a plunger is smoothly operated and which has a sufficient resistance against contamination of an operating oil.

2. Description of the Prior Art

In general, a solenoid valve has a plunger which is slidingly moved within a cylindrical body thereof by a magnetic force, and by the displacement of this plunger, the flow of a fluid may be regulated and other valves, may be switched over. When in use, these necessary operations are frequently performed. As a result, the plunger and the sliding surface of the cylindrical body are worn or damaged as time passes. As a result, the operation of the plunger becomes poor. Therefore, it is necessary to somehow prevent the plunger from becoming ineffective in operation.

In order to meet this requirement, there is known, for example, an operating oil introduction type solenoid valve, in which a cap containing a plunger therein is formed therein with an oil reservoir chamber communicating with the operating oil within an oil tank, and the oil reservoir chamber is communicated with a plunger chamber containing the plunger, thereby to feed the operating oil in the oil reservoir chamber to a space between the plunger and the inner peripheral surface of the cylindrical body for lubrication.

However, that solenoid valve has such a structure as to be dipped into the operating oil and used. Therefore, when, for example, the solenoid valve is taken out of the operating oil and used, the feeding of the operating oil to the oil reservoir chamber is cut. As a result, the lubrication of the plunger becomes poor and thus inconvenient.

SUMMARY OF THE INVENTION

It is therefore an object of the present invention to provide a solenoid valve which is not limited only to such a type of valve which is dipped into oil and used but which can be widely used and in which a plunger thereof can be operated smoothly and stably.

Another object of the present invention is to provide a solenoid valve which has a sufficient resistance against the contamination of an operating oil and in which a smooth and stable operation of a plunger thereof can be obtained.

A further object of the present invention is to provide a solenoid valve which can be easily manufactured merely by changing a conventional device.

In order achieve the above objects, there is essentially provided a solenoid valve in which the displacement of a spool slidably contained within a valve bore of a valve body by means of the displacement of a plunger slidably contained in a plunger chamber, the solenoid valve is characterized in that one end of the valve bore communicating with the plunger chamber is blocked and the valve body is formed therein with an oil reservoir chamber communicating with the valve bore, and the oil reservoir chamber is communicated with the plunger chamber.

The above-mentioned objects, features and advantages of the present invention will become more apparent from the following detailed description with reference to the accompanying drawings.

DETAILED DESCRIPTION OF THE PREFERRED EMBODIMENT

Figure 1:
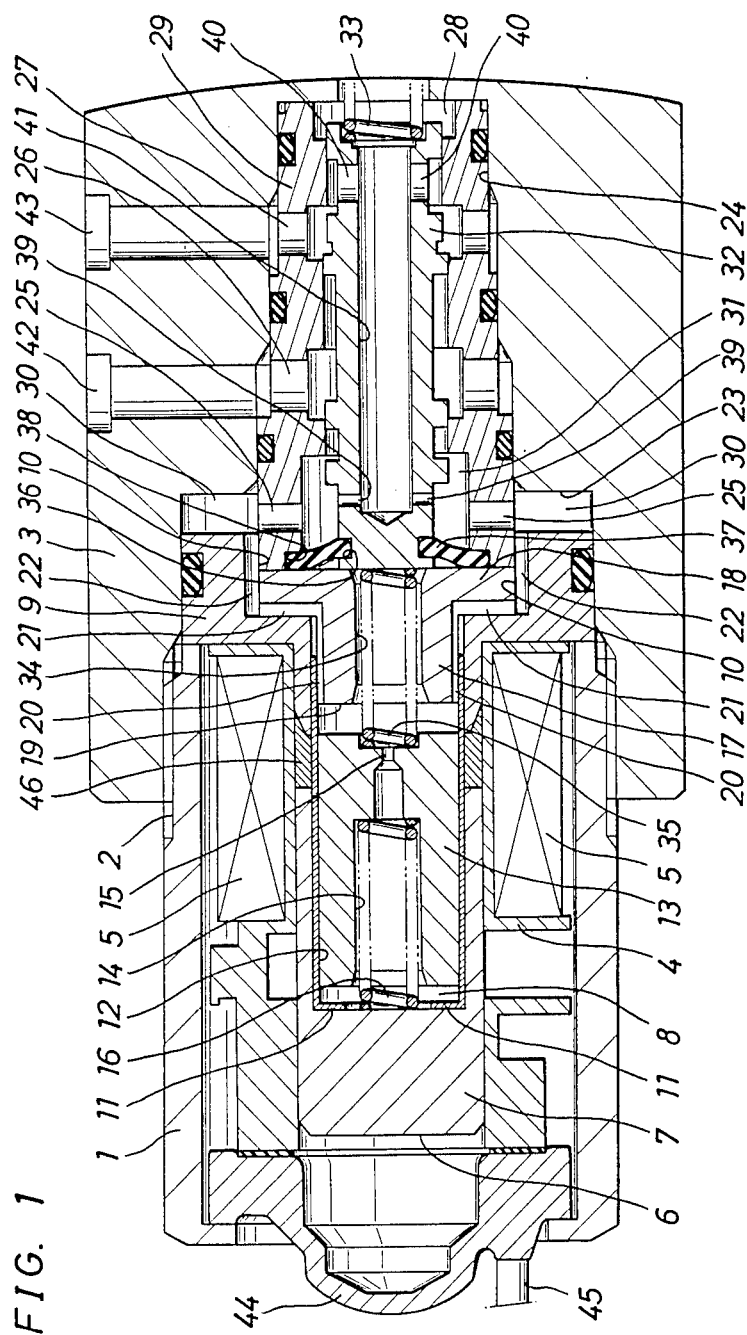
FIG. 1 is a sectional view showing one embodiment of the present invention.

One preferred embodiment of the present invention will be described hereunder with reference to the accompanying drawing. In FIG. 1, reference numeral 1 denotes a valve housing which is provided at the peripheral surface of an end portion thereof with a screw portion 2. The valve housing 1 is secured to a valve body 3 by screwing the screw portion 2 into an end portion of the valve body 3. The valve housing 1 is provided with a coil 5 therein that is contained within a yoke 4. The yoke 4 is provided with a shaft sleeve portion 7 of a stationary iron core 6 which is inserted inside the yoke 4.

The shaft sleeve portion 7 is formed with a plunger chamber 8 therein which has a bottom. The chamber 8 is communicated with a trench 10 opened up at an end face of a flange 9 of the stationary iron core 6 and contains a tubular plunger guide 12 having a bottom made of a nonmagnetic material. Also a bottom margin 11 of the plunger guide 12 is placed at the blocked end of the plunger chamber 8.

The plunger guide 12 is slidably contained therein with a cylindrical plunger 13, both ends of which are provided with a recess 14 and an orifice 15, respectively, communicating with each other. Between the bottom portions of the plunger chamber 8 and recess 14, a plunger spring 16 is interposed to energize the plunger 13 towards the valve body 3.

Within the trench 10, a flange 18 of a stopper 17 is contained. A shaft barrel portion 19 thereof is inserted into the end portion of the opening of the plunger guide 12. By holding the margin of the opening between the inner peripheral surface of the plunger chamber 8 and the peripheral surface of the shaft barrel portion 19, the home position of the plunger guide 12 is maintained.

The shaft barrel portion 19 is formed in the peripheral surface along the axial direction thereof with a plurality of oil grooves 20 forming an oil passage. Similarly, the flange 18 is formed in the inner end face thereof with a plurality of oil grooves 21 like the oil grooves 20, extending in the radial direction. A plurality of oil grooves 22 forming an oil passage formed in the inner peripheral surfaces of the trench 10 along the axial direction are communicated with oil grooves 20 and 21, respectively. One end of the groove 22 is opened up at the end face of the flange 9.

Furthermore, the valve body 3 is formed at one end thereof with a trench 23 having a step for receiving one end of the valve housing 1 and the flange 9. The trench 23 is communicated with a through-hole 24 formed in the valve body 3. The through-hole 24 is provided with a sleeve 29 stationarily contained therein. The sleeve 29 is formed with an introducing hole 25, a pressure port 26 communicating with an oil pressure source, an actuator port 27 communicating with an oil pressure actuator (not shown) and a tank port 28 communicating with an oil tank (not shown). One end of the sleeve 29 is abutted against an end face of the flange 18.

Of them, the introducing hole 25 is opened up at the peripheral surface of the shaft end portion of the sleeve 29 positioned at the trench 23 side, and the opening portion is communicated with an annular oil reservoir chamber 30 defined by the bottom portion of the trench 23, the end face of the flange 9 and the peripheral surface of the sleeve 29.

The sleeve 29 is formed therein with a valve bore 31, within which a spool 32 is slidably contained. The spool 32 is energized towards the stopper 17 through a valve spring 33 disposed at one end thereof. Between the other end of the spool 32 and the plunger 13, a set spring 35 is interposed through a passage hole 34 formed inside the stopper 17. Normally, the spool 32 rests at a position where the springs 33 and 35 and the plunger springs 16 are balanced.

The spool 32 is formed in the peripheral surface of the end portion near the stopper 17 with an annular groove 36 in which a diaphragm 37 is mounted, and the margin of the peripheral end thereof is fitted between a recess 38 formed in the end face of the sleeve 29 and the end face of the flange 18 for maintaining the fluid tight relation between the adjacent valve bore 31 and passage hole 34.

In the figure, reference numerals 39 and 40 denote communicating holes opened up at the peripheral surfaces of both ends of the spool 32. These communicating holes 39 and 40 are communicated with a center hole 41 formed inside the spool 32. Reference numerals 42 and 43 denote oil introducing holes opened up at the peripheral surface of the valve body 3. The oil introducing holes 42 and 43 are communicated with the ports 26 and 27. Reference numeral 44 denotes a cap mounted on the end portion of the valve housing 1 to which a cord 45 containing a leading wire lead out of the coil 5 is connected. Reference numeral 46 denotes a nonmagnetic portion integrally disposed together with the shaft barrel portion 7.

In the solenoid valve having the above-mentioned structure, an annular oil reservoir chamber 30 is defined by and among the bottom portion of the trench 23, the end face of the flange 9 and the peripheral surface of the sleeve 29 by, for example, making the bottom of the trench 23 formed in the valve body 3 slightly deep or by making the thickness of the flange 9 of the stationary iron core 6 thin, and, the chamber 30 is communicated with the valve bore 31 through an introducing hole 25 formed in the sleeve 29.

Furthermore, the trench 10 opened up at the end face of the flange 9 is formed in the inner peripheral surface thereof with the oil groove 22, and the flange 18 of the stopper 17 engaging with the trench 10 is formed in the inner end face thereof with the oil groove 21. The shaft barrel portion 19 inserted into the plunger chamber 8 or the plunger guide 12 is formed in the peripheral surface thereof with the oil groove 20 communicating with the oil groove 21.

In this manner, it is possible to obtain the present invention by changing some of the component parts forming the solenoid valve, such as for example the stationary iron core 6, the stopper 17, the valve body 3, and the sleeve 29. No additional change of other parts or no additional work is required at all. Therefore, the conventional device can be easily changed to obtain the solenoid valve of this invention.

And, when these parts are assembled, the flange 18 is contained within the trench 10 and thereafter, the oil grooves 21 and 22 may be suitably positioned in conformity with the positions of these parts. That is, the oil groove 22 is opened up at the end face of the flange 9 and is necessarily communicated with the oil reservoir chamber 30, while the oil reservoir chamber 30 and the introducing hole 25 also necessarily form a communicating relation in view of the mounting of the sleeve 29. Since an introducing relation between the oil reservoir chamber 30 and the valve bore 31 is established, the above-mentioned assembly can be easily carried out.

Instead of conforming the oil grooves 20 and 21 to the stopper 17, the following modification can be made. That is, the oil grooves 20 and 21 communicating with each other are conformed to the peripheral surface of the end portion of the opening of the plunger chamber 8 and the bottom surface of the trench 10, which respectively contact with the peripheral surface of the shaft barrel portion 19 and the inner end face of the flange 18, and the oil grooves 20 and 21 are communicated with the oil groove 22, and the working on the oil grooves 20, 21 and 22 is concentrated on the stationary iron core 6, thereby to eliminate the working on the stopper 17 and to eleminate the necessity of the relative positioning of the oil grooves 20 and 21 when these are assembled.

In such an assembled solenoid, the coil 5 is normally demagnetized and the plunger 13 is rested at the illustrated position where the respective springs 16, 35 and 33 are balanced. On the other hand, the oil grooves 20 and 21 conformed to the stopper 17 are communicated with the oil groove 22 formed in the trench 10, and the oil groove 20 is opened up within the plunger chamber 8, and the oil groove 22 is opened up within the oil reservoir chamber 30. Therefore, the plunger chamber 8 is communicated with the oil reservoir chamber 30 through these oil grooves 20, 21 and 22.

In addition, the spool 32 is energized by the valve spring 33 and one end of the spool 32 is abutted against the end face of the flange 18 to block one end of the passage hole 34. Furthermore, the pressure port 26 is blocked, and the actuator port 27 is communicated to the center hole 41 through the communicating hole 40; and, at that time, the communicating hole 39 at the other end thereof is opened up at the valve bore 31, and the valve bore 31 is communicated with the oil reservoir chamber 30 through the introducing hole 25. Therefore, the chamber 30 is filled with operating oil coming from the center hole 41 or the valve bore 31.

Therefore, the operating oil within the oil reservoir chamber 30 is fed into the plunger chamber 8 through the oil grooves 22, 21 and 20, and both the interior and exterior of the plunger 13 is normally filled with the operating oil.

Under the circumstances mentioned, when the coil 5 is excited, the plunger 13 is attracted and moved towards the stopper 17 against the set spring 35 and the valve spring 33. At that time, given that the spring 35 is biased and increased in force, the spool 32 is moved rightwards (as shown in the FIG.) against the valve spring 33. As a result, the passage hole 34 is opened.

Consequently, the pressure port 26 and the actuator port 27 are communicated with each other through the valve bore 31. As a result, pressure oil can be fed to the oil pressure actuator. On the other hand, the communicating hole 40 is blocked and the tank port 28 is blocked. Even in this case, the communicating hole 39 is opened up at the valve bore 31, the valve bore 31 is communicated with the oil reservoir chamber 30 through the introducing hole 25, and the chamber 30 is communicated with the center hole 41. Therefore, a part of the operating oil pushed back by the displacement of the plunger 13 is moved to the inner part of the plunger guide 12 through the orifice 15, another part thereof is moved into the passage hole 34 opened up, and the remaining part thereof is returned into the oil reservoir chamber 30 through the oil grooves 20, 21 and 22.

Therefore, the operating oil returned into the oil reservoir chamber 30 is actually very small in quantity. Given that this small quantity of operating oil reaches the chamber 30 via the long bending passage comprising the oil grooves 20, 21 and 22, the dynamic pressure is greatly reduced. Therefore, even if such small quantity of operating oil flows into the valve bore 31 out of the oil reservoir chamber 30, the displacement of the spool 32 is not adversely affected at all. If one end of the passage hole 34 is opened, the valve bore 31 and the passage hole 34 are partitioned by the diaphragm 37 and the fluid tight relation is maintained. Therefore, no direct flow of the operating oil has taken place therebetween.

Under the circumstances mentioned, if the coil 5 is demagnetized, the plunger 13 is pushed back by the set spring 35 and valve spring 33, and at the same time, the spool 32 is pushed back by the spring 33 to restore the illustrated original state.

That is, the plunger 13 and the spool 32 are rested at the position where the plunger spring 16 and springs 33 and 35 are balanced, one end of the spool 32 is abutted against the end face of the flange 18 to block one end of the passage hole 34, and the pressure port 26 is blocked and the actuator port 27 and tank port 28 are communicated through the communicating hole 40 and center hole 41.

Consequently, the returning oil from the oil pressure actuator flows into the center hole 41 from the oil introducing hole 43 via the actuator port 27 and communicating hole 40. A part of the returning oil is returned to the oil tank from the tank port 28, another part thereof flows into the valve bore 31 from the center hole 41 via the communicating hole 39 and is further guided into the oil reservoir chamber 30 from the valve bore 31 via the introducing hole 25.

Therefore, the movement of the returning oil towards the plunger chamber 8 through the oil grooves 20, 21 and 22 together with the operating oil within the oil reservoir chamber 30, makes it possible to feed or refill the operating oil into the chamber 8. Even in this case, given that the valve bore 31 and passage hole 34 are partitioned by the diaphragm 37, the returning oil is never directly flowed into the passage hole 34.

On the other hand, the operating oil pushed back by the plunger 13, is joined with the operating oil pushed into the hole 34 owing to the blocking of the passage hole 34 and moved towards the oil reservoir chamber 30 through the oil grooves 20, 21 and 22.

These quantities of moving oil remain small under the condition that the pressure of the returning oil is comparatively low and the change of the capacity of the plunger chamber 8 owing to the displacement of the plunger 13 being small. In addition, these quantities of moving oil are collided against each other while receiving the oil damper effect and the bending passage within the oil grooves 20, 21 and 22. Therefore, the moving oil is reduced in dynamic pressure and restricted in movement towards the plunger chamber 8 and oil reservoir chamber 30. As a result, the oil reaching the chambers 8 and 30 is restricted to a very small quantity.

That is, while the plunger chamber 8 can be fed or refilled with the operating oil from the oil reservoir chamber 30, the quantity of operating oil is restricted small under the normal use conditions where both the chambers 8 and 30 and the oil grooves 20, 21 and 22 are filled with the operating oil. Therefore, even if the operating oil within the oil reservoir chamber 30 is contaminated by, for example, the returning oil, it never happens that the operating oil within the plunger chamber 30, too, and that the foreign matter in the contaminating oil enters into a space between the inner peripheral surface of the plunger guide 12 and the plunger 13 to make the operation of the plunger poor.

Therefore, even if the operating oil of the oil pressure circuit is contaminated, the current oil permeating state by the operating oil is maintained within the plunger chamber 8 and the smooth and reliable operation of the plunger 13 can be obtained. Therefore, sufficient resistance against the contamination of the operating oil is achieved.

In this way, a solenoid valve of the present invention is not limited to such type of valve which is placed in oil and used, but is widely applicable to general solenoid valves. Therefore, a general purpose use can be obtained. In addition, a smooth and stable operation can be obtained.

Furthermore, according to the present invention, when operating oil is fed to the plunger chamber from the oil reservoir chamber, the direct feeding of the operating oil to the plunger chamber from the valve bore is prevented by blocking one end of the valve bore communicating with the plunger chamber, thereby preventing the operating oil within the plunger chamber from becoming contaminated by the contaminated oil flowing into the valve bore. Therefore, a smooth and stable operation of the plunger can be obtained. In addition, it has a sufficient resistance against the contamination of the operating oil.

Furthermore, given that a solenoid valve of the present invention can be manufactured merely by making changes to this type of conventional device, the present invention can be easily manufactured.

It will be appreciated that various modifications and changes of the preferred embodiment may be made without departing from the scope of the present invention as defined in the accompanying claims.

What is claimed is:

1. A solenoid valve comprising
    a valve housing provided therein with an exciting coil;
    a valve body formed with a trench at one end thereof, with a through-hole inside thereof and with a plurality of oil introducing holes communicating with said through-hole and opened up at a peripheral surface thereof, said valve housing being secured to said trench;
    a sleeve secured into said through-hole and formed therein with a valve bore, said sleeve being provided with a plurality of ports for communicating the valve bore and the oil introducing hole and an introducing hole communicating with the bore and trench, said ports and introducing hole being opened up at a peripheral surface of said sleeve;
    a spool slidably contained within said valve bore and formed therein with a center hole communicating with an oil tank, said spool being provided with a plurality of throughholes opened up at a peripheral surface thereof and communicating with the trench and valve bore, said spool being normally energized towards said valve housing by a spring;
    a stationary iron core including a shaft barrel portion disposed inside said coil and a flange disposed within said trench, said flange being formed at an end face thereof with a trench, said trench being formed at an inner peripheral surface thereof with an oil groove communicating with said trench;

a plunger chamber means having a bottom formed inside said iron core and communicating with the trench of said flange;

a tubular plunger guide having a bottom made of a nonmagnetic material and disposed at a home position of an inner peripheral surface of the plunger chamber means;

a plunger slidably contained within said plunger guide and driven by electromagnetic force of said coil, said plunger being normally energized towards said valve body by a plunger spring;

a stopper including a shaft barrel portion contained within said plunger chamber means and a flange contained within the trench of said flange, an end face of said flange being engaged with an end face of said sleeve, said shaft barrel portion and flange being formed at an peripheral surface and inner peripheral surface thereof with an oil groove communicating with each other, said oil groove being communicated with said plunger chamber means and oil groove, said stopper being formed therein with a passage hole communicating with said plunger chamber means;

a diaphragm mounted on an end portion of said spool and adapted to block the communication between the adjacent valve bore and passage hole; and an oil reservoir chamber means defined by the inner peripheral surface of the trench, the peripheral surface of the spool and the end face of the flange of the stopper and communicated with said valve bore through said introducing hole and also with plunger chamber means through said respective oil grooves.

2. A solenoid valve as claimed in claim 1, wherein said stationary iron core engaging with the shaft barrel portion of said stopper and the inner surface of said flange is formed at the inner peripheral surface with an oil groove communicating with each other and also with said plunger chamber means and the inner peripheral surface of the trench of said iron core.

3. A solenoid valve as claimed in claim 2, wherein the oil passage comprising comprising said various oil grooves, said oil reservoir chamber and said introducing hole is bent at several points.

4. A solenoid valve as claimed in clam 1 wherein the oil passage comprising said various oil grooves, said oil reservoir chamber and said introducing hole is bent at several points.

* * * * *